(12) United States Patent  (10) Patent No.: US 6,712,385 B2
Enders                     (45) Date of Patent:     Mar. 30, 2004

(54) DENT AND VIBRATION RESISTANT RIGID KNEE AIRBAG

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/242,556

(22) Filed: Sep. 11, 2002

(65) Prior Publication Data

US 2004/0007862 A1 Jan. 15, 2004

Related U.S. Application Data

(63) Continuation-in-part of application No. 10/193,411, filed on Jul. 11, 2002.

(51) Int. Cl.⁷ .............................................. B60R 21/22
(52) U.S. Cl. ................................... 280/730.1; 280/752
(58) Field of Search ........................... 280/730.1, 801.1, 280/805, 751, 752; 296/70

(56) References Cited

U.S. PATENT DOCUMENTS

| | | | |
|---|---|---|---|
| 4,721,329 A | 1/1988 | Brantman et al. | 280/751 |
| 5,700,050 A | 12/1997 | Gonas | 296/189 |
| 5,775,729 A | 7/1998 | Schneider et al. | 280/730.1 |
| 6,039,380 A * | 3/2000 | Heilig et al. | 296/70 |
| 6,378,898 B1 * | 4/2002 | Lewis et al. | 280/733 |
| 6,471,242 B2 * | 10/2002 | Schneider | 280/732 |
| 2002/0125708 A1 * | 9/2002 | Schneider | 280/753 |

* cited by examiner

Primary Examiner—Paul N. Dickson
Assistant Examiner—Faye M. Fleming
(74) Attorney, Agent, or Firm—James D. Erickson; Sally J. Brown

(57) ABSTRACT

An inflatable rigid knee airbag system for assisting in positioning and decelerating a vehicle occupant is disclosed. The system may include a front and a rear rigid panel, which may be made from sheet metal. The front and rear rigid panels define at least a portion of an inflatable chamber. The inflatable chamber is in fluid communication with an inflator that injects inflatable gas into the inflatable chamber when accident conditions exist. A support core positioned between the front and rear panels dampens vibrations of the front and rear panels and minimizes unsightly denting of the front panel when the inflatable rigid knee airbag system is in a pre-deployment state. The support core may be made from foam.

36 Claims, 9 Drawing Sheets

DENT AND VIBRATION RESISTANT RIGID KNEE AIRBAG

RELATED APPLICATIONS

This application is a continuation-in-part of patent application Ser. No. 10/193,411 filed Jul. 11, 2002 entitled An Expandable Rigid Knee Airbag System, which is incorporated by this reference.

BACKGROUND OF THE INVENTION

1. Field of the Invention

The present invention relates to an airbag designed to protect the occupants of a vehicle during a collision. More specifically, the invention relates to a rigid knee airbag that is dent and vibration resistant.

2. Technical Background

Inflatable airbags enjoy widespread acceptance as passive passenger restraints for use in motor vehicles. This acceptance has come as airbags have built a reputation of preventing numerous deaths and injuries over years of development, testing, and use. Studies show that in some instances, the use of frontally placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers, and the thousands of prevented injuries they represent, demonstrate the life-saving potential of airbags and the need to encourage their use, production, and development.

Airbags are often installed in the steering wheel and in the dashboard on the passenger side of a car. These airbags are used for the primary deceleration of a vehicle occupant since, in a large percentage of collisions, the occupant is accelerated forward within the vehicle. Such airbags are generally housed within the dashboard, steering wheel, or other similar interior panels of a vehicle, and are covered by a trim cover panel. The trim cover panel covers the compartment that contains the airbag module. Such airbag covers are typically made of rigid plastic, and are configured to be opened by the pressure created by the deploying airbag. During deployment of the airbag, it is preferable to retain the airbag cover in at least partial attachment to the vehicle to prevent the airbag cover from flying loose in the passenger compartment.

Airbags are generally linked to a control system within the vehicle that triggers their initiation when a collision occurs. Generally, an accelerometer within the vehicle measures the abnormal deceleration caused by the collision event and triggers the ignition of an airbag inflator. This control system is often referred to as an electronic control unit ("ECU"). The ECU includes a sensor that continuously monitors the acceleration and deceleration of the vehicle and sends this information to a processor that uses an algorithm to determine whether a collision has occurred.

When the processor of the ECU determines that the vehicle is experiencing a collision, the ECU transmits an electrical signal to an initiator assembly, which is connected to an inflator that is coupled to the airbag module. The initiator activates the inflator. An inflator is a gas generator that typically uses a compressed or liquefied gas or a mixture of gases, a solid fuel, or some combination of the two, to rapidly generate a large volume of inflation gas. The gas is then channeled, often through a segment of specialized tubing called a gas guide, into the airbag. The gas inflates the airbag, thus placing it in the path of the vehicle occupant and allowing it to absorb the impact of the vehicle occupant.

As experience with the manufacture and use of airbags has progressed, the engineering challenges involved in their design, construction, and use have become better understood. First, most airbag systems are designed to rapidly inflate and provide a cushion in front of or alongside an occupant based on a presumption that the occupant will be in a predetermined position. Problems have been noted to occur when the occupant is "out of position" with regard to this presumed placement when a collision. event occurs and the airbag deploys. Similarly, problems may occur when the occupant, though possibly at first in the predicted position, strikes a glancing blow to the airbag, and is then deflected away from the airbag before proper deceleration can occur.

Out-of-position injuries may be attributed in part to the fact that most airbag systems have been primarily designed for deployment in front of the torso of an occupant. More specifically, such airbags are disposed for deployment between the upper torso of an occupant and the windshield and instrument panel. During a front-end collision, there is a tendency for an occupant, particularly one who is not properly restrained by a seat belt, to slide forward along the seat. This results in poor kinematics and positioning when the occupant interacts with a frontal airbag, such as a driver's side or passenger's side airbag.

In order to avoid such dangers to occupants, knee airbag systems have been developed. These airbags deploy during a collision event and engage an occupant's knees or lower legs. This holds the occupant in place on the seat, and improves the kinematics of the occupant.

Such knee airbag systems include a knee airbag and a panel, referred to as a knee bolster panel, which is disposed in front of the knee airbag. The addition of a knee bolster panel to the airbag provides a more rigid surface area to better engage and decelerate the knees or legs of an occupant and thereby restrain the occupant's lower body. Additionally, the knee bolster panel allows some degree of deformation to minimize the impact of an occupant.

Such knee airbag systems, like many other airbag systems, suffer from high costs and engineering problems. Specifically, knee airbags are difficult to mount in the tight spaces available under the steering column or dashboard. Further, many current knee airbag systems use an inflator located at a remote location. Such systems require the use of costly gas guides suitable for conducting hot inflation gases from the inflator to the airbag. Additionally, the airbags themselves must be treated with various coatings to protect the fabric of the airbag itself from the heat of the gas. Also, in some specific applications, such as mounting an airbag in the door of a glove box of a vehicle, fabric airbags have proven very difficult to install.

To both automobile manufacturers and consumers, aesthetic aspects of a knee airbag system are also important. For example, the visible portion of a stored knee airbag module in a vehicle must be both durable and attractive prior to deployment of the airbag. Otherwise, automobile manufacturers will be slow to incorporate these types of airbags into their vehicles and may seek out alternative technologies that do not adversely impact the appearance of the vehicle. Furthermore, if a stored airbag module vibrates during operation of the vehicle in which it is located, the vibration may produce undesired noise. Automobile owners may believe that the generated noise indicates that something is mechanically wrong with the vehicle. Of course, automobile manufacturers would quickly discontinue using an airbag module that generates unwanted vibrations and noise.

Thus, it would be an advancement in the art to provide an inflatable rigid knee airbag system to protect a vehicle occupant in collision events in a wide variety of situations. Specifically, it would be an advancement in the art to provide a knee airbag suitable for mounting in a vehicle under the steering column or dashboard, including mounting in a glove box door. It would also be an advancement in the art to provide a knee airbag system that permits direct mounting of the inflator to the airbag. Additionally, it would be an advancement in the art to provide a knee airbag system having a visible portion which is both durable and aesthetically pleasing. It would also be an advancement in the art if the knee airbag system is resistant to vibration and thus does not produce unwanted noise.

SUMMARY OF THE INVENTION

The apparatus and method of the present invention have been developed in response to the present state of the art, and in particular, in response to problems and needs in the art that have not yet been fully solved by currently available airbag systems. More specifically, the inflatable rigid knee airbag system provides a versatile and low-cost airbag module that does not generate unwanted vibration or noise.

The inflatable rigid knee airbag system includes a rear panel and a front panel. The rear and front panels are generally planar and are formed from a substantially rigid material, such as sheet metal. The front panel may have various shapes such as rectangular, square or elliptical. The rear and front panels are attached to each other generally around their respective perimeters to define an inflatable chamber. Various methods of attachment may be used within the scope of this invention. For instance, a series of spot welds may be used to secure the front and rear panels to each other.

The rear panel is folded such that it expands, or unfolds, when inflatable gas is injected into the inflatable chamber. More specifically, the rear panel includes both vertical folds and accordion folds. Prior to inflation of the inflatable chamber, the vertical folds include three fold lines that form a generally A-frame shaped ridge. The accordion folds include two fold lines that define an accordion type fold. The vertical folds and accordion folds expand, at least partially unfold, when gas is forced into the inflatable chamber.

The rear panel also includes a rectangular orifice for interfacing with an adapter unit. The adapter unit includes a hollow rigid box that is seated within the rectangular orifice of the rear panel. A series of connector studs on the adapter unit are positioned within mating orifices on the rear panel. Nuts, or other securing devices, attached to the connector studs secure the adapter unit to the rear panel. Other securing mechanisms or techniques, such spot welds, may be used to secure the adaptor unit to the rear panel. An inflator is positioned within the orifice of the hollow rigid box such that the inflator is in fluid communication with the inflatable chamber.

A support core is positioned between the rear and front panels. The support core substantially occupies the inflatable chamber defined by the front and rear panels. The support core may be made from an injected or a pre-formed foam that is heat resistant, such as a phenolic foam. The shape of the pre-formed foam is defined before placement into the inflatable chamber. The injected foam, on the other hand, is poured or blown in a liquid or semi-liquid state into the inflatable chamber. The support core is attached to either the front or rear panel, both the front and rear panels, or neither of the panels.

The support core may be designed to break into smaller pieces in response to injection of inflatable gas into the inflatable chamber. The support core may also include a recess into which inflatable gas will initially be directed to facilitate breaking the support core into smaller pieces. Alternatively, the support core may be designed to remain in substantially a single piece during inflation of the inflatable chamber. This may be achieved by attaching the support to the front panel, but not the rear panel, and by forming the support core from a substantially resilient material.

The support core serves at least two purposes. First, the support core provides support to the front panel to limit denting of the front panel prior to deployment of the inflatable rigid knee airbag system. This support enhances the aesthetic appearance of the front panel, the portion of the airbag system that is visible to an occupant of the vehicle. Second, the support core separates the front and rear panels from each other to prevent the panels from vibrating against each other and generating unwanted noise. Additionally, attachment of the support core to either the front panel or rear panel further limits undesirable vibration and noise.

The front panel may be attached to, or integrated with, a decorative trim panel. The decorative trim panel can be a glove box door cover or other interior panel for the vehicle. The decorative trim panel may be attached to the front panel using various fastening techniques, such as rivets, snap-fitting devices, spot welding, and thermoplastic welding techniques. The decorative trim panel also functions as a knee bolster that deforms slightly in response to an impact of a vehicle occupant to dissipate the energy of the impact and minimize potential injuries to the occupant. The decorative trim panel can be produced by a number of known techniques, such as thermoplastic injection-molding or a skin and foam molding process commonly employed in the automotive industry.

An alternative embodiment of the inflatable rigid knee airbag system includes a front panel, a rear panel, and an extensible bellows panel. The front, rear, and bellows panels may each be formed from a substantially rigid material, again such as sheet metal.

The front, rear, and bellows panels define an inflatable chamber. The front and rear panels are substantially planar in shape. The bellows panel is positioned between the front and rear panels and is attached to the perimeter of the front and rear panels to define the inflatable chamber. The bellows panel may be positioned in a compact or an inflated position. When inflatable gas is forcefully injected into the inflatable chamber the bellows panel at least partially unfolds, expanding the inflatable chamber.

An inflator is secured within an opening in the rear panel such that the inflator is at least partially positioned within the inflatable chamber. More specifically, gas exit ports on the inflator are positioned within the inflatable chamber to enable rapid inflation of the chamber.

As in the first embodiment of the inflatable rigid knee airbag system, a support core is positioned between the front and rear panels to dampen vibration and to provide support to the front panel to minimize unsightly denting. Again, the support core may be made from various types of foam, e.g., injected or pre-formed foam. The support core may include a recess to facilitate breaking the support core into smaller pieces during inflation of the inflatable chamber. Alternatively, the support core may be designed to remain in substantially a single piece during inflation of the inflatable chamber.

In view of the foregoing, the inflatable rigid knee airbag system provides substantial advantages over conventional airbag systems. The inflatable rigid knee airbag system is versatile and may be positioned within various locations in a vehicle, such as in a glove box door or underneath the steering wheel. The inflatable chamber of the inflatable rigid knee airbag system may be formed from a rigid material, such as sheet metal, thus avoiding the need for expensive heat-resistant fabrics or treatments. The support core minimizes the danger of denting to the front panel and dampens vibration to limit unwanted noise when the inflatable rigid knee airbag system is in a pre-deployment state.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–9. The members of the present invention, as generally described and illustrated in the Figures, may be constructed in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
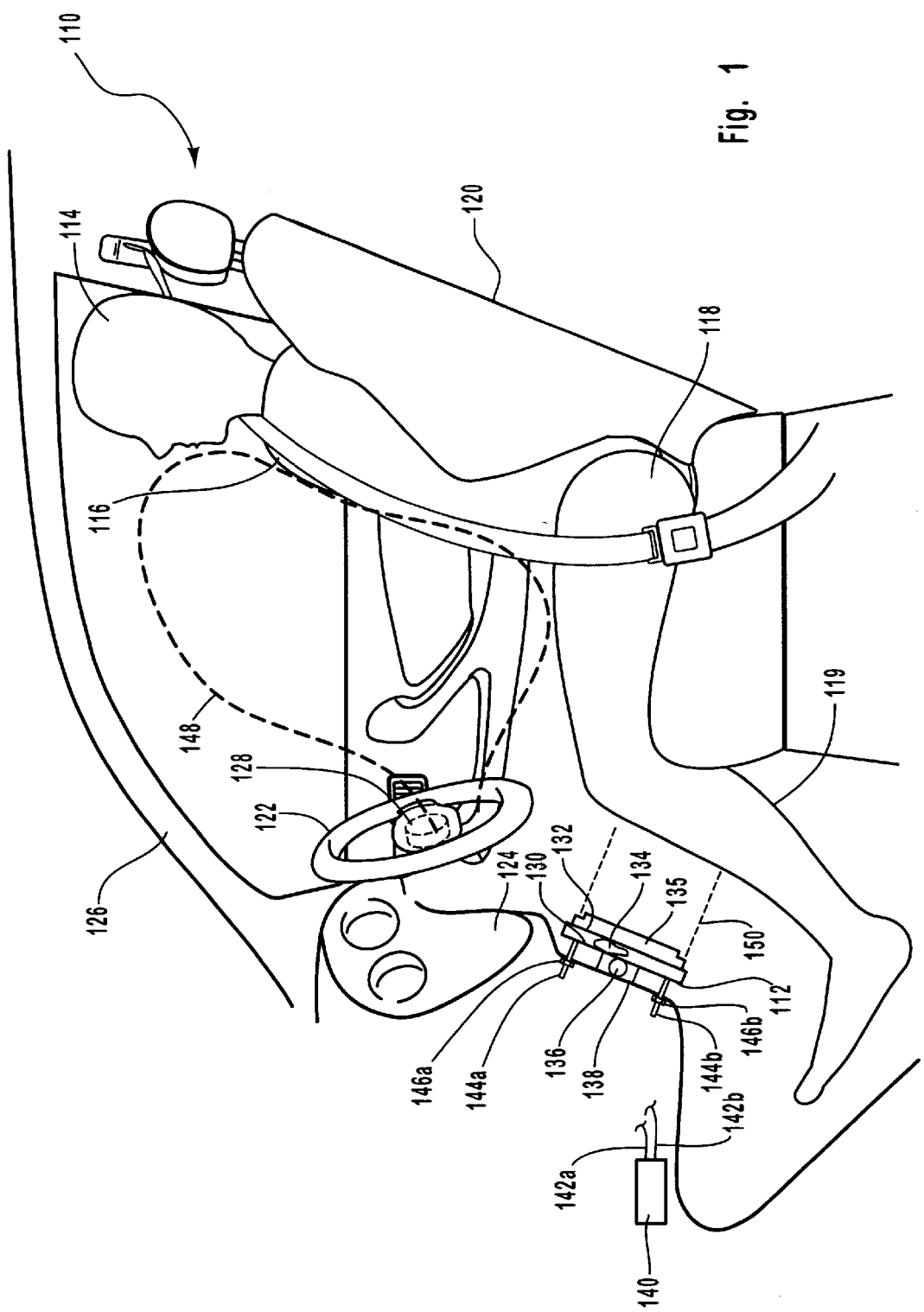
FIG. 1 is a side cutaway view of an interior portion of a vehicle including an inflatable rigid knee airbag system.

Referring to FIG. 1, there is shown a side cutaway view of an interior portion of a vehicle 110 having an inflatable rigid knee airbag system 112. A vehicle occupant 114 having an upper body portion 116, a lower body portion 118, and legs 119 is shown seated in a front seat 120. The front seat 120 is located near a steering wheel 122, an instrument panel 124, and a windshield 126. A primary airbag 128 is contained within the steering wheel 122. The inflatable rigid knee airbag system 112 is mounted in a lower portion of the instrument panel 124 within the vehicle 110.

The location of the inflatable rigid knee airbag system 112 in FIG. 1 is exemplary only. The inflatable rigid knee airbag system 112 may be positioned in a number of different locations. For example, the airbag system 112 may be positioned underneath the front seat 120 facing the legs 119 of the occupant 114 or in front of a front passenger seat (not illustrated).

The inflatable rigid knee airbag system 112 includes a rear panel 130 and a front panel 132 that is an attached to an optional decorative trim panel 135. A cutaway view of the inflatable rigid knee airbag system 112 illustrates the inflatable chamber 134 defined by the rear and front panels 130, 132. The inflatable chamber 134 will be discussed in greater detail below. The decorative trim panel 135 serves as a bolster for contacting the legs 119 of the occupant 114 during a collision involving the vehicle 110. The decorative trim panel 135 also allows the airbag system 112 to be integrated into and aesthetically complement the interior of the vehicle 110.

The airbag system 112 further includes an inflator 136 and an adapter unit 138, as will be explained in detail below. The system 112 also has a sensor mechanism 140, which is configured to sense an impact to the vehicle 110. A pair of lead wires 142a–b are attached to the sensor mechanism 140. The lead wires 142a–b provide electrical communication between the sensor mechanism 140 and the inflator 136.

The rear and front panels 130, 132 are attached to the vehicle 110 by a pair of connector studs 144a–b held in place by a pair of nuts 146a–b. Of course, the airbag system 112 may be attached to the vehicle 110 using various types of mechanical connectors, such as bolts, nuts, clamps, clips, and the like.

Upon receipt of an electrical signal transmitted from the sensor mechanism 140, the primary airbag 128 and the inflatable chamber 134 inflate into their respective inflated positions 148, 150. In its inflated position 148, the primary airbag 128 prevents the upper body portion 116 of the occupant 114 from being propelled forward toward the windshield 126. When this occurs, there is a tendency for the lower portion 118 of the occupant 114 to be propelled forward and under the primary airbag 128. This tendency is sometimes referred to as "submarining," and may be quite pronounced when the occupant 114 is not properly restrained by a seat belt. In its inflated position 150, the inflatable rigid knee airbag system 112 limits submarining, i.e., limits the lower body portion 118 of the vehicle occupant 114 from sliding forward.

Figure 2:
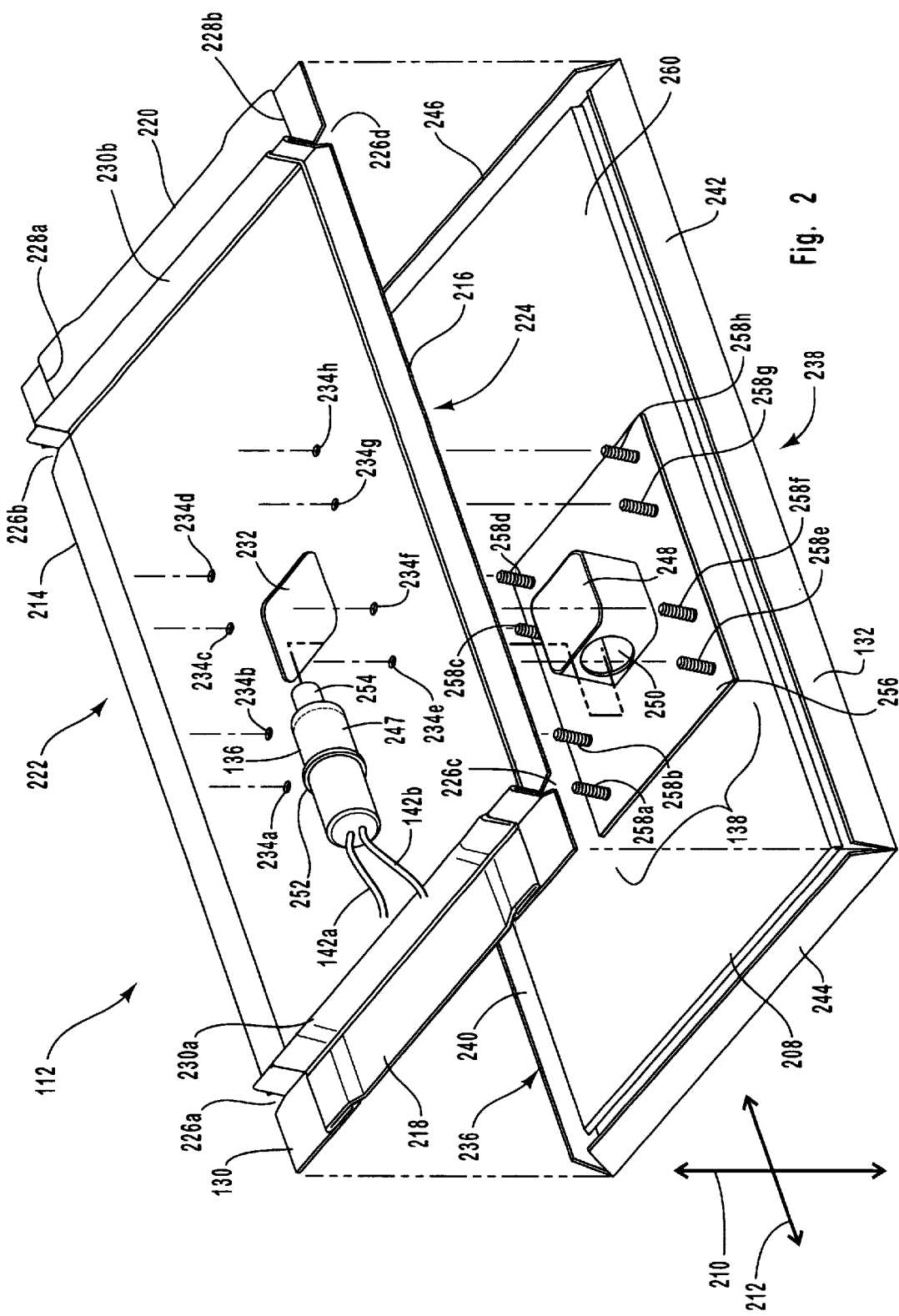
FIG. 2 is an exploded perspective view of the inflatable rigid knee airbag system including a support core.

FIG. 2 is an exploded perspective view of the inflatable rigid knee airbag system 112. As stated above, the inflatable rigid knee airbag system 112 includes a rear panel 130, a front panel 132, an inflator 136, and an adapter unit 138. The inflatable rigid knee airbag system 112 also has a vertical direction 210 and a horizontal direction 212.

The rear panel 130 has an upper edge 214, a lower edge 216, a left side edge 218, and a right side edge 220. The rear panel 130 also has a front side 222 and a backside 224 opposite the front side 222.

Four recesses 226a, 226b, 226c, 226d are positioned around the perimeter of the rear panel 130. In particular, a first recess 226a is positioned on the upper edge 214 toward the left edge 218. A second recess 226b is positioned on the lower edge 216 toward the right edge 220. A third recess 226c is positioned on the lower edge 216 toward the left edge 218. A fourth recess 226d is positioned on the upper edge 214 toward the right edge 220.

First and second accordion folds 228a, 228b extend from the left edge 218 to the right edge 220 in a horizontal direction 212. A first vertical fold 230a protrudes out of the front side 222 in a vertical direction 210 and extends from the first recess 226a to the third recess 226c. Similarly, a second vertical fold 230b protrudes out of the front side 222 in a vertical direction 210 and extends from the second recess 226b to the fourth recess 226d. The configuration of the accordion folds 228a, 228b and the vertical folds 230a, 230b will be explained in detail below in connection with FIG. 6.

The first vertical fold 230a intersects the first accordion fold 228a near the upper edge 214 and the left edge 218. The first vertical fold 230a intersects the second accordion fold 228b near the lower edge 216 and the left edge 218. The second vertical fold 230b intersects the first accordion fold 228a near the upper edge 214 and the right edge 220. The second vertical fold 230b intersects the second accordion fold 228b near the lower edge 216 and the right edge 220.

A rectangular orifice 232 is positioned approximately halfway between the upper c edge 214 and the lower edge 216, and approximately halfway between the left edge 218 and the right edge 220. The rectangular orifice 232 is sized to receive an adapter unit 138, as will be described in detail below. Four small orifices 234a, 234b, 234c, 234d are arranged in a horizontal direction 212 between the rectangular orifice 232 and the upper edge 214. Similarly, four small orifices 234e, 234f, 234g, 234h are arranged in a horizontal direction 212 between the rectangular orifice 232 and the lower edge 216. Each of the small orifices 234a, 234b, 234c, 234d, 234e, 234f, 234g, 234h is sized to receive a connector stud, as will be described in detail below.

The front panel 132 has a front side 236 and a backside 238 opposite the front side 236. The front panel 132 has an upper peripheral region 240, a lower peripheral region 242, a left peripheral region 244, and a right peripheral region 246. The area of the front panel 132 is greater than the area of the rear panel 130 to allow the peripheral regions 240, 242, 244, 246 to be folded around the edges 214, 216, 218, 220 of the rear panel 130.

Both the rear panel 130 and the front panel 132 are preferably made from a rigid material. For example, the rear panel 130 and the front panel 132 may be made from sheet metal.

The inflator 136 may be of any suitable type or construction for supplying a medium for inflating the inflatable rigid knee airbag system 112. For example, the inflator 136 may be a pyrotechnic inflator that uses the combustion of gas-generating material to generate an inflation fluid, such as a gas or foam. The inflator 136 optionally includes a diffuser portion 247 for disseminating the inflation fluid. The inflator 136 also includes lead wires 142a–b that place the inflator 136 in electrical communication with the sensor mechanism 140 (shown in FIG. 1).

The adapter unit 138 is configured to receive the inflator 136. The precise configuration of the adapter unit 138 will depend on the type of inflator 136 used. In the embodiment shown in FIG. 2, the adapter unit 138 includes a hollow rigid box 248 with an orifice 250 in one side. Of course, various other configurations for the adapter unit 138 will be readily apparent to one skilled in the art in light of the teachings contained herein.

When the inflator 136 discharges, it is desirable to limit the escape of inflation fluid through the orifice 250. This may be accomplished in a variety of ways. For example, a plastic sealing wedge 252 may be placed around the inflator 136. When the inflator 136 is inserted into the orifice 250, the sealing wedge 252 then creates a tight seal between the inflator 136 and the adapter unit 138. Alternatively, the diameter of the orifice 250 may simply be closely matched to the diameter of the inflator 136.

When the inflator 136 discharges, it is also desirable for the inflator 136 to be secured to the adapter unit 138 so that the force of the discharge does not cause the inflator 136 to be propelled out of the orifice 250 away from the adapter unit 138. This, too, may be accomplished in a variety of ways. For example, the inflator 136 may include a connector stud 254 attached to the diffuser portion 247 of the inflator 136. The adapter unit 138 may include a small orifice (not shown) opposite the orifice 250 that receives the adaptor unit 138, the small orifice having a diameter which is slightly larger than the connector stud 254. The inflator 136 may be inserted through the orifice 250 so that the connector stud 254 extends through the small orifice. A nut (not shown) may then be used to secure the inflator 136 to the adapter unit 138. Of course, various other methods for attaching the inflator 136 to the adapter unit 138 will be readily apparent to one skilled in the art in light of the teachings contained herein.

The adapter unit 138 includes a plate 256. The hollow rigid box 248 may be integral with the plate 256, or it may be attached to the plate 256 using, for example, welding techniques or adhesives. Four connector studs 258a, 258b, 258c, 258d are arranged in a horizontal direction 212 near the distal edge of the plate 256, and four connector studs 258e, 258f, 258g, 258h are arranged in a horizontal direction 212 near the proximal edge of the plate 256. Each of the connector studs 258a, 258b, 258c, 258d, 258e, 258f, 258g, 258h is positioned to be received by one of the small orifices 234a, 234b, 234c, 234d, 234e, 234f, 234g, 234h of the rear panel 130. The portion of the plate 256 over which the hollow rigid box 248 sits includes an orifice (not shown), so that inflation fluid from the inflator 136 may be directed into the airbag system 112.

Figure 3:
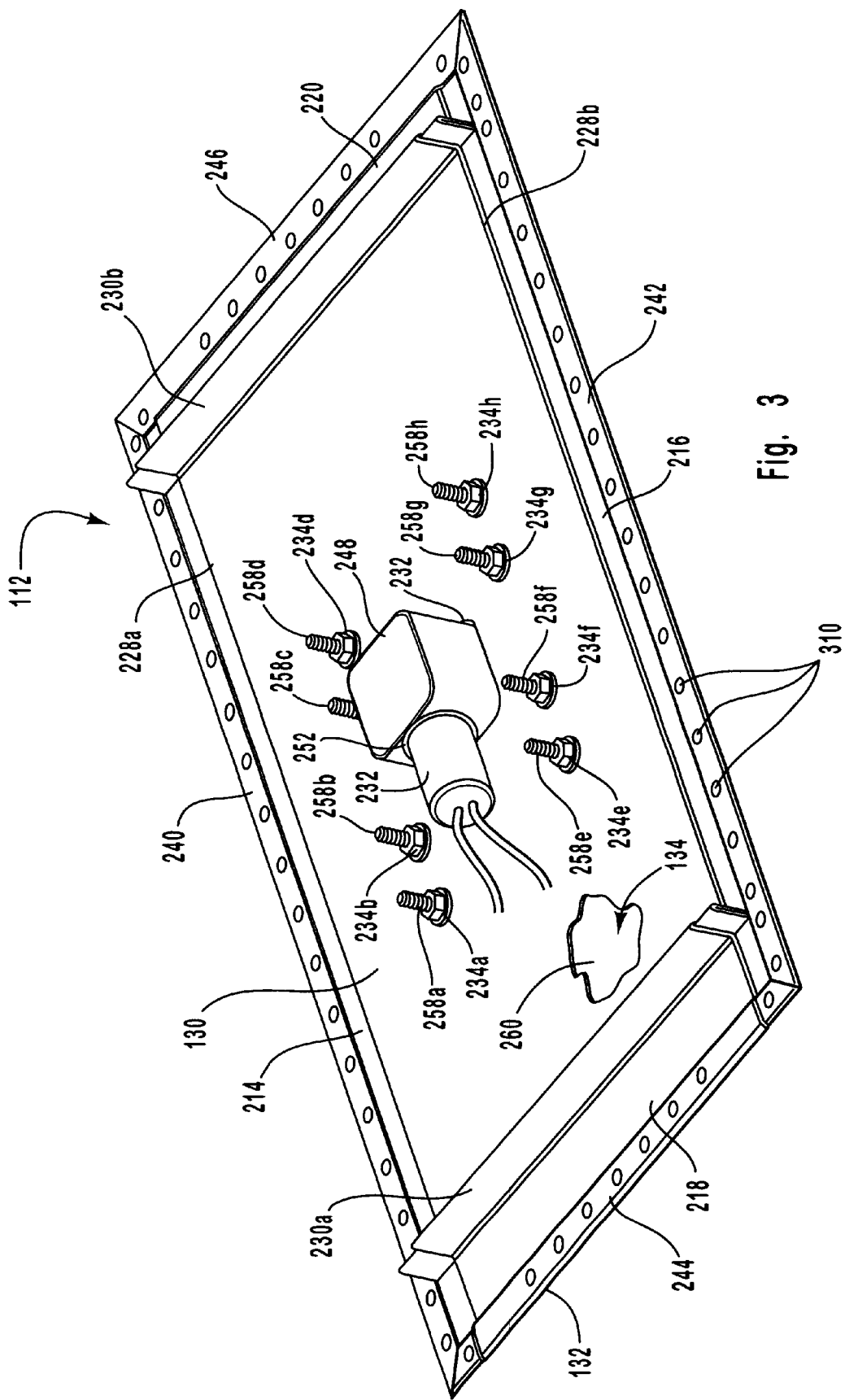
FIG. 3 is a top perspective view of the inflatable rigid knee airbag system in a compact position.

The inflatable rigid knee airbag system 112 also includes a support core 260. The support core 260 is positioned between the rear and front panels 130, 132. More specifically, when the rear and front panels 130, 132 are attached to each other, as illustrated in FIG. 3, the support core 260 is positioned between the rear and front panels 130, 132.

The support core 260 is substantially coextensive with the rear and front panels 130, 132 and is formed in generally the same shape as the rear and front panels 130, 132. Accordingly, the support core 260 substantially occupies the inflatable chamber 134 (shown in FIG. 1) defined by the rear and front panels 130, 132.

The support core 260 addresses at least two potential problems with the inflatable rigid knee airbag system 112. First, the front panel 132, being formed from metal, may be easily dented or deformed in the absence of a support core 260. Second, the rear and front panels 130, 132 may vibrate in the absence of a support core 260, generating an undesirable noise. As such, those skilled in the art will recognize that the support core 260 can be designed in a wide variety of configurations to minimize either one or both of these problems. For example, the support core 260 may include a number of columns (not shown) positioned between the rear and front panels 130, 132 to minimize the danger of denting or vibration. The support core 260 may be made from foam. For instance, in one embodiment, the foam is a pre-formed foam, as will be discussed in detail in connection with FIG. 6. Alternatively, the foam may be an injected foam. The injected foam may be poured or blown in a liquid or semi-liquid state into the chamber 134 (shown in FIG. 1) defined by the front and rear panels 130, 132. Thereafter, the injected foam solidifies and substantially occupies the inflatable chamber 134.

The support core 260 is attached to both the rear and front panels 130, 132. Alternatively, the support core 260 may be attached to either the rear or front panel 130, 132. Various types of adhesives may be used to attach the support core 260 to one or both of the panels 130, 132. Alternatively, attachment may occur when an injected foam solidifies and expands to occupy the inflatable chamber 134.

The support core 260 should also be heat-resistant. During inflation of the airbag system 112, the support core 260 is subjected to high temperatures for a short period of time as hot inflation gases from the inflator 136 move into the inflatable chamber 134. Accordingly, a heat-resistant Phenolic foam core may be used, such as Thermo-Cor from American Technologies, Inc., of Ronceverte, W.Va.

With reference to FIG. 3, there is illustrated a top perspective view of the inflatable rigid knee airbag system 112 in its compact position. The rear panel 130 is partially cutaway to show the support core 260 positioned within the inflatable chamber 134. The upper peripheral region 240 of the front panel 132 is folded around the upper edge 214 of the rear panel 130. The lower peripheral region 242 of the front panel 132 is folded around the lower edge 216 of the rear panel 130. The left peripheral region 244 of the front panel 132 is folded around the left edge 218 of the rear panel 130. Finally, the right peripheral region 246 of the front panel 132 is folded around the right edge 220 of the rear panel 130. A plurality of spot welds 310 are disposed around each of the peripheral regions 240, 242, 244, 246 to attach the front panel 132 to the rear panel 130. In an alternative embodiment, the area of the front panel 132 may be substantially equal to the area of the rear panel 130, and the peripheral regions of the front panel 132 and the rear panel 130 may be welded together in a continuous fashion.

The hollow rigid box 248 extends through the rectangular orifice 232. The connector studs 258a, 258b, 258c, 258d, 258e, 258f, 258g, 258h extend through the small orifices 234a, 234b, 234c, 234d, 234e, 234f, 234g, 234h (shown in FIG. 2). A plurality of nuts 312a, 312b, 312c, 312d, 312e, 312f, 312g, 312h secure the connector studs 258, 258b, 258c, 258d, 258e, 258f, 258g, 258h to the rear panel 130. The inflator 136 is inserted into the orifice 250 of the hollow rigid box 248 so that the connector stud 254 (shown in FIG. 2) of the inflator 136 extends through the small orifice (not shown) in the hollow rigid box 248. A nut (not shown) may be used to secure the connector stud 254 of the inflator 136 to the hollow rigid box 248. The plastic sealing wedge 252 creates a tight seal between the inflator 136 and the adapter unit 138.

Figure 4:
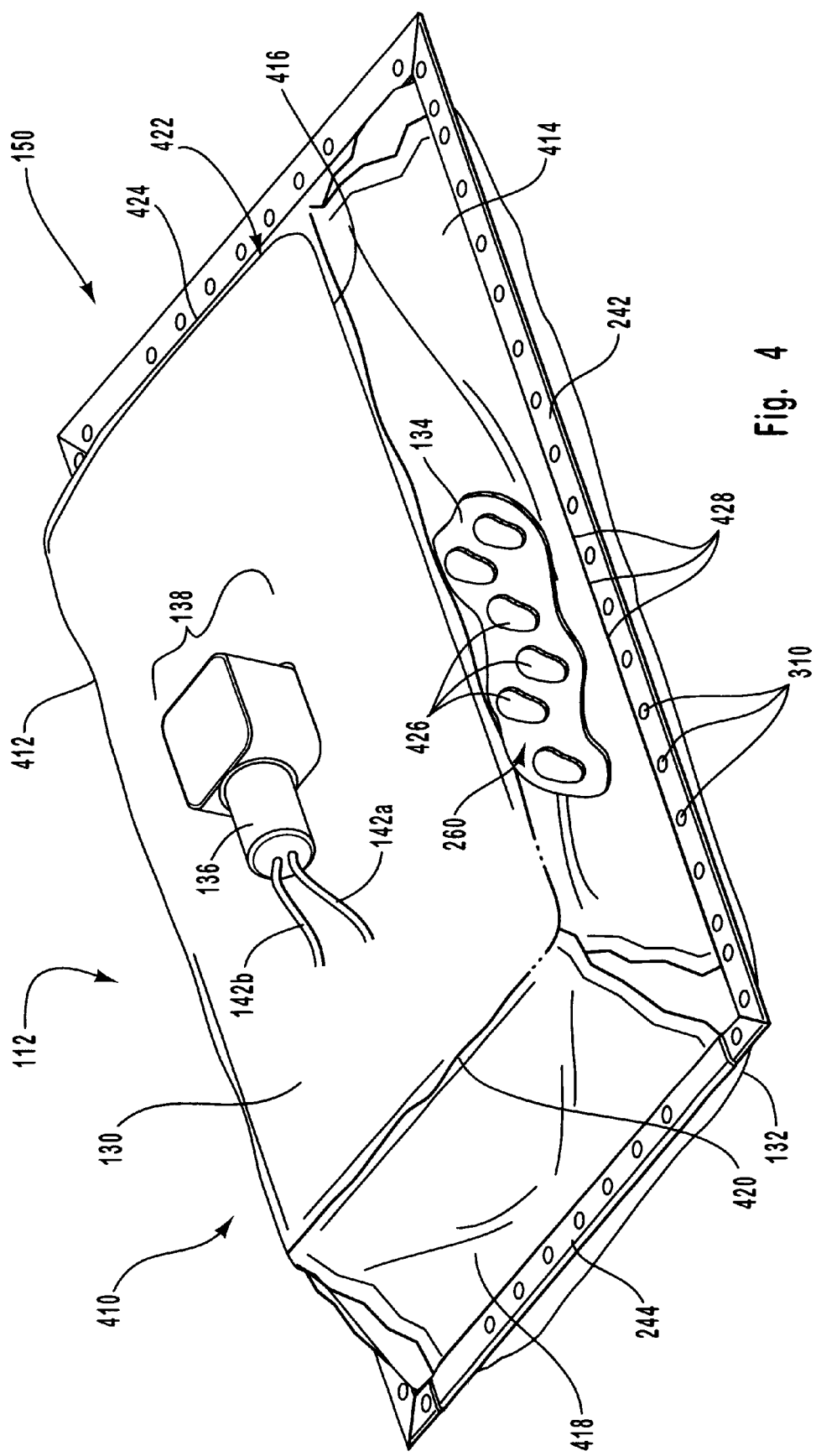
FIG. 4 is a top perspective view of the inflatable rigid knee airbag system in an inflated position having a partially cutaway portion illustrating the support core broken into smaller pieces.

FIG. 4 is a top perspective view of the inflatable rigid knee airbag system 112 in an inflated position 150. The first accordion fold 228a (shown in FIG. 3) has unfolded to form a first substantially planar wall 410 having a first upper edge 412, and the second accordion fold 228b (shown in FIG. 3) has unfolded to form a second substantially planar wall 414 opposite the first substantially planar wall 410 and having a second upper edge 416. Similarly, the first vertical fold 230a (shown in FIG. 3) has unfolded to form a third substantially planar wall 418 having a third upper edge 420, and the second vertical fold 230b (shown in FIG. 3) unfolds to form a fourth substantially planar wall 422 opposite the third substantially planar wall 418 and having a fourth upper edge 424. The area of the rear panel 130 enclosed by the upper edges 412, 416, 420, 424 is substantially parallel to the front panel 132.

Advantageously, the accordion folds 228a, 228b and the vertical folds 230a, 230b allow the front panel 132 to remain substantially flat during inflation. This permits the airbag system 112 to inflate evenly, thereby reducing the likelihood that the trim panel 135 will interact with the vehicle occupant 114 at an angle during an accident. In addition, the cross-sectional area of the airbag system 112 in its inflated position 150 is about the same as the cross-sectional area of the airbag system 112 in its compact position. This allows the airbag system 112 to be more easily integrated into the interior of the vehicle 110.

The front panel 132 may be made to be thicker than the rear panel 130. For example, in one embodiment the front panel 132 is made from sheet metal that is about 0.020 inches thick, while the rear panel 130 is made from sheet metal that is about 0.014 inches thick. This difference in thickness further enhances the ability of the front panel 132 to remain substantially flat during inflation.

In FIG. 4, the rear panel 130 is partially cutaway to show the support core 260 within the inflatable chamber 134. As illustrated, the support core 260 is broken into smaller pieces 426 in response to injection of inflation gases into the inflatable chamber 134. During inflation of the inflatable chamber 134, inflation gas may escape through small gaps 428 between the rear and front panel 130, 132 in the area adjacent to the spot welds 310. Accordingly, the smaller pieces 426 may be forced into the small gaps 428 and thus may act as a sealant during inflation of the chamber 134.

A number of different factors may contribute to breaking the support core 260 into the smaller pieces 426 during inflation of the inflatable chamber 134. For instance, the support core 260 may be attached by an adhesive or other attachment mechanism to both the rear and front panels 130, 132. As such, separation of the rear and front panels 130, 132 from each other during inflation of the inflatable chamber 134 breaks the support core 260 into smaller pieces 426. In addition, the force of injecting inflation gas into the inflatable chamber 134 also breaks the support core 260 into smaller pieces 426.

Figure 5:
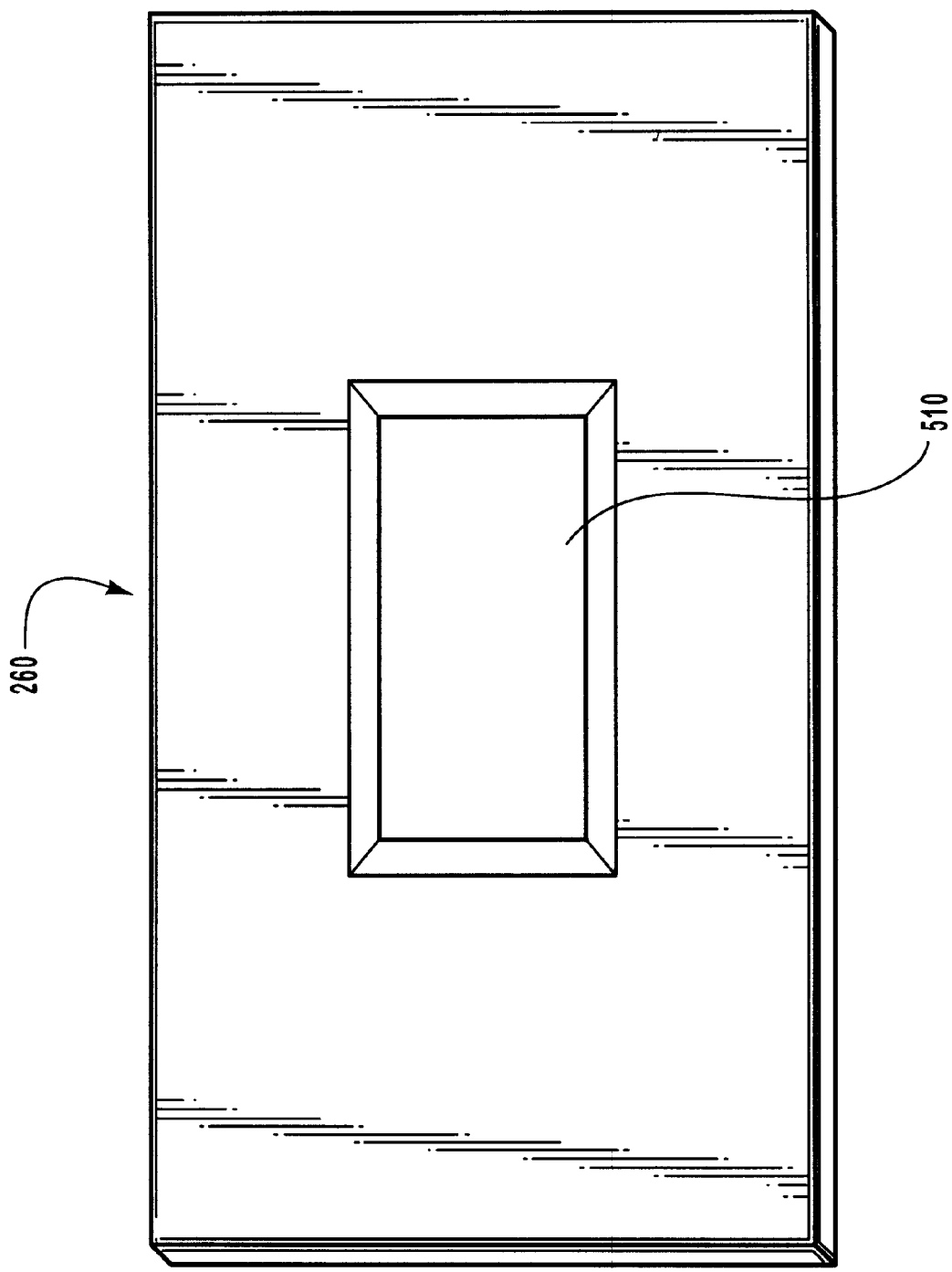
FIG. 5 is a perspective view of a pre-formed support core.

FIG. 5 is a perspective view of a support core 260. More specifically, FIG. 5 illustrates a pre-formed support core 260 defining a recess 510 into which inflation gas is directed during inflation of the inflatable chamber 134 to facilitate breaking the support core 260 into smaller pieces 426. The recess 510 may further facilitate breaking a bond between the support core 260 and the rear and/or the front panels 130, 132 during inflation of the chamber 134.

The recess 510 may be formed in a number of different shapes. As illustrated, the recess 510 may have a generally tapered rectangular shape. The recess 510 may be adapted to receive a portion of the inflator 136 that protrudes into the inflatable chamber 134.

Figure 6:
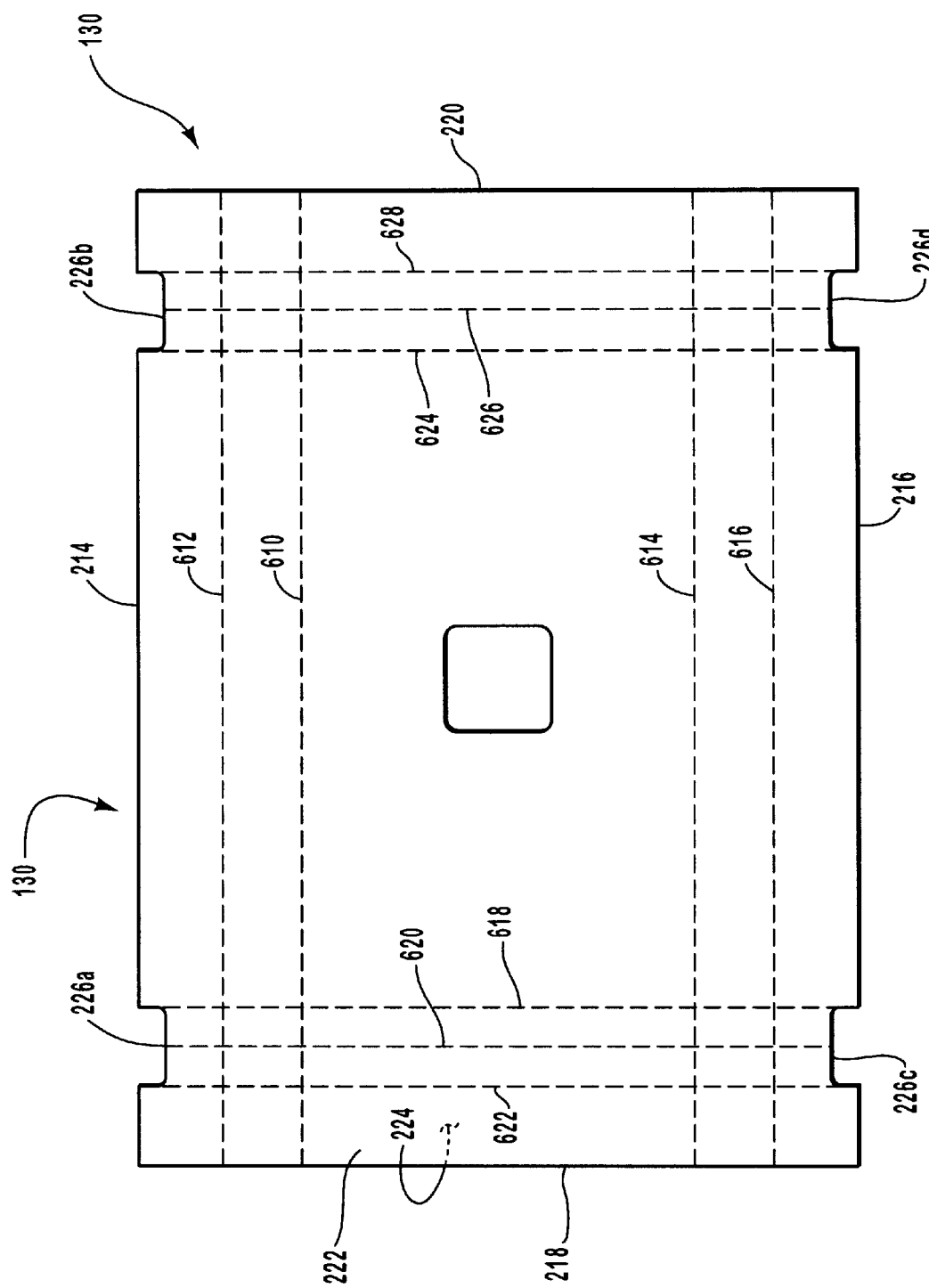
FIG. 6 is a top plan view of the rear panel of the rigid knee airbag in a prefolded state.

Referring to FIG. 6, a top plan view of the rear panel 130 of the inflatable rigid knee airbag system 112 in a pre-folded state is shown. One example of how the accordion folds 228a, 228b (shown in FIG. 3) and the vertical folds 230a, 230b (shown in FIG. 3) may be created will now be explained.

To create the first accordion fold 228a, the upper edge 214 is first bent at about a 180° angle toward the backside 224 along the fold line 610. The upper edge 214 is then bent at about a 180° angle toward the front side 222 along the fold line 612.

To create the second accordion fold 228b, the lower edge 216 is first bent at about a 180° angle toward the backside 224 along the fold line 614. The lower edge 216 is then bent at about a 180° angle toward the front side 222 along the fold line 616.

To create the first vertical fold 230a, the left edge 218 is first bent at about a 90° angle toward the front side 222 along the fold line 618. The left edge 218 is then bent at about a 180° angle toward the backside 224 along the fold line 620. Finally, the left edge 218 is bent at about a 90° angle toward the front side 222 along the fold line 622.

To create the second vertical fold 230b, the right edge 220 is first bent at about a 90° angle toward the front side 222 along the fold line 624. The right edge 220 is then bent at about a 180° angle toward the backside 224 along the fold line 626. Finally, the right edge 220 is bent at about a 90° angle toward the front side 222 along the fold line 628.

Of course, numerous other methods for creating the accordion folds 228a, 228b and the vertical folds 230a, 230b will be readily apparent to one skilled in the art in light of the teachings contained herein.

In the embodiment shown in FIGS. 1 through 6, the front panel 132 is disposed substantially parallel to the rear panel 130 after inflation, thereby reducing the likelihood that the trim panel 135 will interact with the vehicle occupant 114 at an angle during an accident. Alternatively, the folds 610, 612, 614, 616, 618, 620, 622, 624, 626, 628 may be formed such that, after inflation of the inflatable chamber 134, the rear and front panels 130, 132 are disposed at an angle relative to each other.

Figure 7:
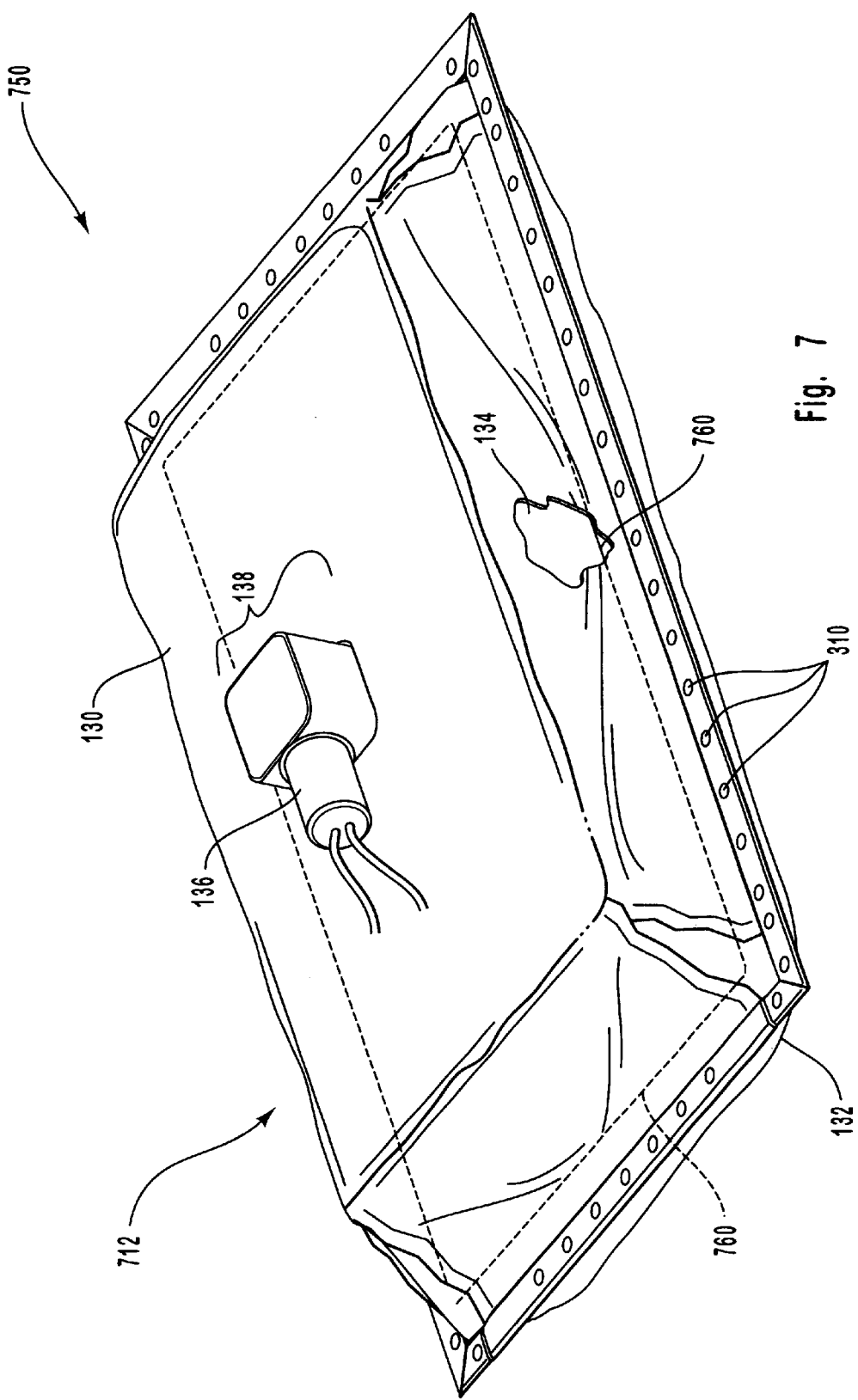
FIG. 7 is a top perspective view of the inflatable rigid knee airbag system in an inflated position having a partially cutaway portion illustrating an alternative embodiment of the support core.

FIG. 7 is a top perspective view of an alternative embodiment of the inflatable rigid knee airbag system 712 in an inflated position 750. As in the embodiment described in FIGS. 1–6, the embodiment shown in FIG. 7 includes a rear panel 130 and a front panel 132 that define an inflatable chamber 134, which is shown in an inflated position 750. Spot welds 3 10 connect the rear and front panels 130, 132 to each other. An adapter unit 138 houses the inflator 136 that inflates the inflatable chamber 134.

In FIG. 7, a portion of the rigid knee airbag system 712 is cut away to illustrate a support core 760 positioned within the inflatable chamber 134. The support core 760 of the embodiment illustrated in FIG. 7 is slightly different than the support core 260 shown in FIGS. 1–6. More specifically, the support core 760 of this embodiment is designed to remain in substantially a single piece following inflation of the inflatable chamber 134. This may be achieved in a number of different ways. For instance, the support core 760 may be attached the front panel 132, but not the rear panel 130. Accordingly, the support core 760 will remain attached to the front panel 132 in a substantially single piece even after inflation of the inflatable chamber 134. In addition or in the alternative, the support core 760 may be formed from a more resilient material, such as a more resilient foam, that will not break into smaller pieces in response to the force of inflation gas being injected into the inflatable chamber 134.

Figure 8:
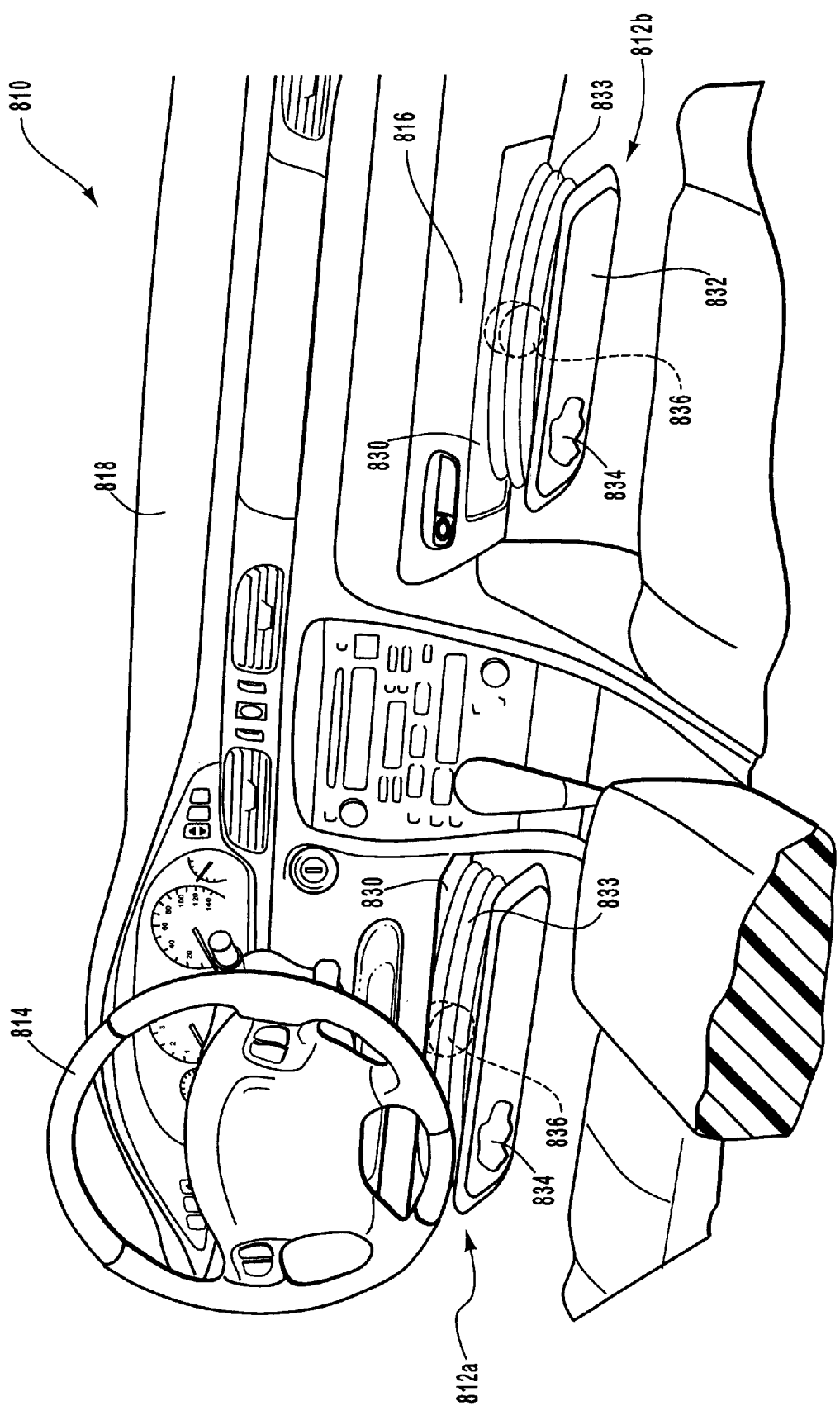
FIG. 8 is a perspective view of an alternative embodiment of the inflatable rigid knee airbag system shown mounted in a vehicle and inflated.

Referring to FIG. 8, there is shown a perspective view of an interior portion of a vehicle 810 including an alternative embodiment of the inflatable rigid knee airbag system 812a, 812b. A first inflatable rigid knee airbag system 812a is shown placed under the steering wheel 814 of the vehicle 810 and inflated. A second inflatable rigid knee airbag system 812b is shown mounted in the glove box door 816 in the passenger's side of the vehicle 810 under the dashboard 818 and inflated. As will be understood by those skilled in the art, a vehicle 810 may be equipped with one or more inflatable rigid knee airbag systems 812 positioned at various locations throughout the vehicle 810.

Each rigid airbag system 812 includes a rigid rear panel 830, a rigid front panel 832, and an extensible bellows panel 833. In FIG. 8, a portion of the rigid front panel 832 is cut away to illustrate an inflatable chamber 834 defined by the rear rigid panel 830, the rigid front panel 832, and the extensible bellows panel 833. When accident conditions exist, an inflator 836 injects inflatable gas into the inflatable chamber 834 to expand the chamber 834 and provide protection to an occupant of the vehicle 810. A single inflator 836 may be used to inflate one or more rigid airbag systems 812. In addition, one or more control systems may be used to control each coupled inflator 836 in an independent or interrelated fashion.

In FIG. 8, the rear, front and bellows panels 830, 832, 833 are generally rectangular in shape. Alternatively, however, the panels 830, 832, 833 could be configured in other shapes, such as circular, square, or elliptical.

Figure 9:
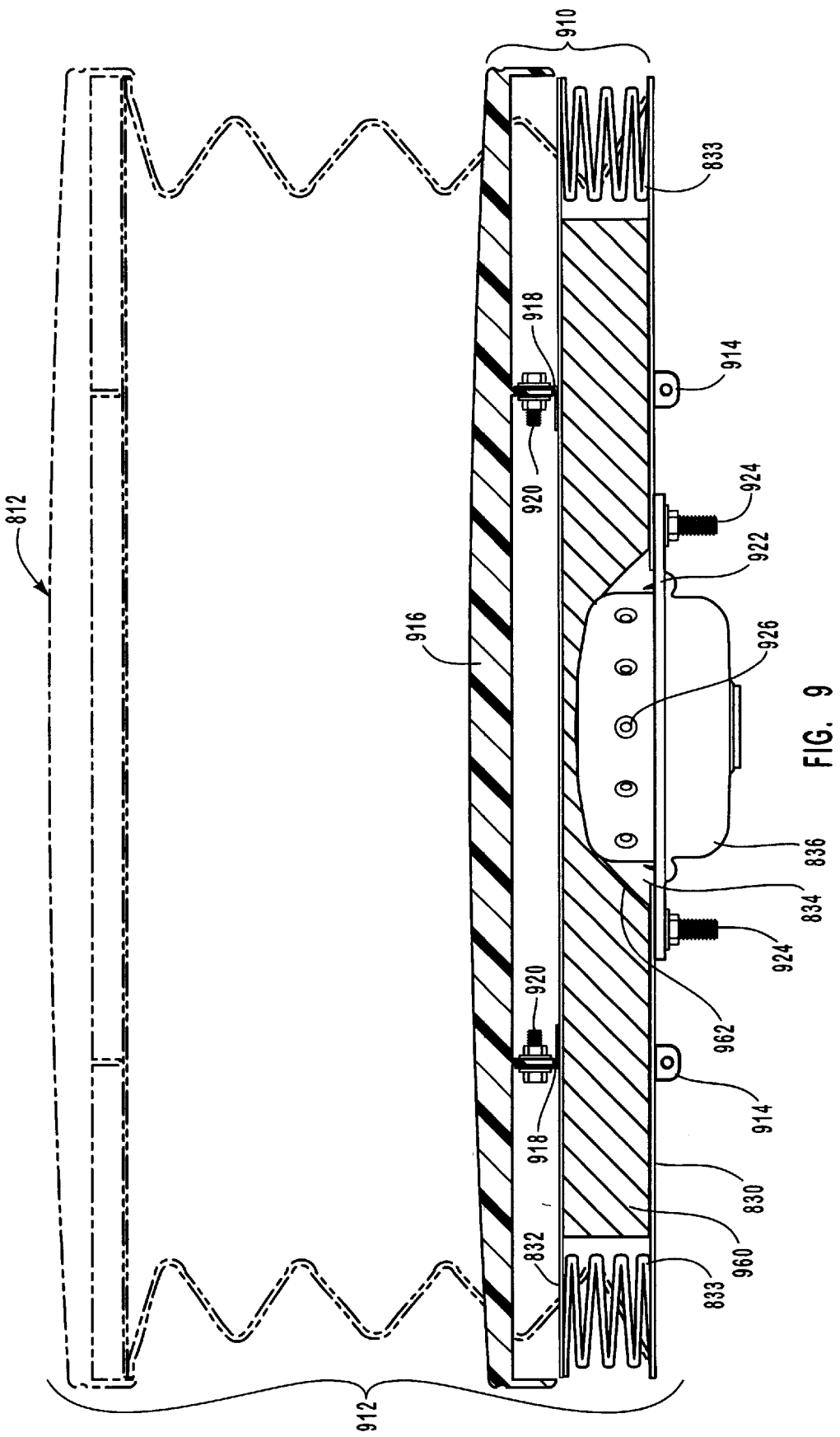
FIG. 9 is a cutaway view of the rigid airbag system of FIG. 8 shown in its compact position and, in phantom, in its inflated position including a perspective view of the inflator.

FIG. 9 is a cutaway view of the rigid airbag system 812 of FIG. 8 shown in its compact position 910, and also shown in its inflated position 912 in phantom. As stated, the system 812 includes a rigid rear panel 830, a rigid front panel 832, and an extensible bellows panel 833. The extensible bellows panel 833 is attached to the rear and front panels 830, 832 to define the inflatable chamber 834. The bellows panel 833 is formed with one or more extensible accordion folds. The bellows panel 833 may be made from a number of different materials that are substantially rigid, including metal or plastic. For instance, the bellows panel 833 can be made from one or more sheets of metal from about 16 to about 32 U.S. standard gauge. The bellows panel 833 may comprise a single sheet of rigid material rolled and pleated to the proper configuration, or may alternatively comprise multiple panels of the rigid material joined using methods known in the art. Also, the bellows panel 833 may be formed in various shapes to define, for example, a generally elliptical or rectangular inflatable chamber 834. The bellows panel 833 unfolds, or expands, in response to injection of inflatable gas into the inflatable chamber 834, as illustrated in phantom in FIG. 9.

Like the bellows panel 833, the rear and front panels 830, 832 are also made from a substantially rigid material such as sheet metal or plastic. The rear and front panels 830, 832 are generally planar and, as shown in FIG. 8, may have an elliptical or generally rectangular shape. Connector brackets 914 on the rear panel 830 can be used to secure the inflatable rigid knee airbag system 812 to the vehicle 810. The rear panel 830 may be formed from a rigid material of greater thickness than the material from which the front panel 832 is formed to provide greater stability to the knee airbag system 812 and to enable direct attachment of the rear panel 830 to a vehicle 810 without the use of connector brackets 914.

The rear and front panels 830, 832 are attached to the bellows panel 833 using conventionally known techniques, such as spot welding, thermoplastic welding, brazing, crimping, rivets, or other fastening devices. Alternatively, the rear and front panels 830, 832 may be integrally formed with the bellows panel 833.

In FIG. 9, the front panel 832 is attached to a decorative trim panel 916. The decorative trim panel 916 can be a glove box door cover or other interior panel for the vehicle 810. The decorative trim panel 916 may be attached to the front panel 832 using various fastening techniques, such as rivets, snap-fitting devices, spot welding, and thermoplastic welding techniques. As illustrated, attachment is accomplished using front mounting brackets 918 and fasteners 920.

The decorative trim panel 916 also functions as a knee bolster that deforms slightly in response to an impact of a vehicle occupant to dissipate the energy of the impact and minimize potential injuries to the occupant. The decorative trim panel 916 can be produced by a number of known techniques, such as thermoplastic injection-molding or a skin and foam molding process commonly employed in the automotive industry.

The inflator 836, shown in a perspective view in FIG. 9, is positioned within an opening 922 in the rear panel 830. Connector studs 924 attached to or integrally formed with the rear panel 830 are used to secure the inflator 836 to the rear panel 830. Other attachment techniques, such as welding or adhesives, may be used to secure the inflator 836 to the rear panel 830. Exit gas ports 926 on the inflator 836 are positioned within the inflatable chamber 834. Accordingly, when the inflator 836 is activated, inflator gas exits the inflator 836 through gas ports 926 to inflate the inflatable chamber 834. In an alternative embodiment, which is not illustrated, the inflator 836 may be remote to, but in fluid communication with, the inflatable chamber 834.

As illustrated, a support core 960 is positioned between the rear and front panels 830, 832. The support core 960 serves to dampen vibrations or prevent unsightly denting of the front panel 832. As with the support core 260 discussed in connection with FIGS. 2–6, the support core 960 of FIG. 9 may be made from various types of materials, such as a pre-formed foam or an injected foam. The support core 960 may be attached to either the rear or front panel 830, 832 or both. Here, the support core 960 includes a recess 962 in which the inflator 836 is positioned. When the knee airbag system 812 is in its inflated position 912, the support core 960 is broken into smaller pieces (not shown). The recess 962 initially receives inflator gas exiting the inflator 836 and, accordingly, facilitates breaking the support core 960 into smaller pieces. Alternatively, the support core 960 may be designed to remain in substantially a single piece during inflation of the inflatable chamber 834.

In view of the foregoing, the inflatable rigid knee airbag system provides substantial advantages over conventional airbag systems. The inflatable rigid knee airbag system is versatile and may be positioned within various locations in a vehicle, such as in a glove box door or underneath the steering wheel. The inflatable chamber of the inflatable rigid knee airbag system may be formed from sheet metal, not fabrics, thus avoiding the need for expensive heat-resistant fabrics or treatments. Furthermore, the support core minimizes the danger of denting to the front panel and dampens vibration to limit unwanted noise when the inflatable rigid knee airbag system is in a pre-deployment state.

What is claimed is:

1. An inflatable airbag comprising:
   a rear panel;
   a front panel attached to the rear panel, wherein the front and rear panels are constructed of substantially rigid materials; and
   a support core positioned in an inflatable chamber defined at least in part by the front and rear panels.

2. The inflatable airbag of claim 1, wherein the support core comprises foam.

3. The inflatable airbag of claim 2, wherein the foam comprises a preformed foam.

4. The inflatable airbag of claim 3, wherein the preformed foam defines a recess into which inflation gas is directed.

5. The inflatable airbag of claim 2, wherein the foam comprises an injected foam.

6. The inflatable airbag of claim 2, wherein the foam comprises a phenolic foam.

7. The inflatable airbag of claim 1, wherein the support core substantially occupies the inflatable chamber.

8. The inflatable airbag of claim 1, wherein the support core is attached to the front panel.

9. The inflatable airbag of claim 1, wherein the support core is attached to both the front and rear panels.

10. The inflatable airbag of claim 1, wherein the support core breaks into smaller pieces in response to injection of inflation gases into the inflatable chamber.

11. The inflatable airbag of claim 1, wherein the rear panel is directly attached to the front panel.

12. The inflatable airbag of claim 1, wherein the rear panel deforms in response to injection of inflation gases into an inflatable chamber defined by the front and rear panels.

13. The inflatable airbag of claim 1, further comprising an extensible bellows panel attached to both the front and rear panels.

14. An inflatable knee airbag comprising:
    a rear panel;
    a front panel attached to the rear panel,
    wherein the front and rear panels are constructed of substantially rigid materials; and
    a support core positioned in an inflatable chamber defined at least in part by the front and rear panels and attached to at least one of the front and rear panels.

15. The inflatable knee airbag of claim 14, wherein the support core comprises foam.

16. The inflatable knee airbag of claim 15, wherein the foam comprises a pre-formed foam.

17. The inflatable knee airbag of claim 16, wherein the pre-formed foam defines a recess into which inflation gas is directed.

18. The inflatable knee airbag of claim 15, wherein the foam comprises an injected foam.

19. The inflatable knee airbag of claim 15, wherein the foam comprises a phenolic foam.

20. The inflatable knee airbag of claim 14, wherein the support core substantially occupies the inflatable chamber.

21. The inflatable knee airbag of claim 14, wherein the support core breaks into smaller pieces in response to injection of inflation gases into the inflatable chamber.

22. The inflatable knee airbag of claim 14, wherein the rear panel is directly attached to the front panel.

23. The inflatable knee airbag of claim 22, wherein the rear panel deforms in response to injection of inflation gases into an inflatable chamber defined by the front and rear panels.

24. The inflatable knee airbag of claim 14, further comprising an extensible bellows panel attached to both the front and rear panels.

25. An inflatable airbag system comprising:
   a rear panel;
   a front panel attached to the rear panel, wherein the front and rear panels are constructed of substantially rigid materials;
   an inflatable chamber defined at least in part by the front and rear panels;
   a support core substantially occupying the inflatable chamber; and
   an inflator in fluid communication with the inflatable chamber for generating inflation gas to fill the inflatable chamber.

26. The inflatable airbag system of claim 25, wherein the support core comprises foam.

27. The inflatable airbag system of claim 26, wherein the foam comprises a pre-formed foam.

28. The inflatable airbag system of claim 27, wherein the pre-formed foam defines a recess into which inflation gas is directed.

29. The inflatable airbag system of claim 26, wherein the foam comprises an injected foam.

30. The inflatable airbag system of claim 26, wherein the foam comprises a phenolic foam.

31. The inflatable airbag system of claim 25, wherein the support core is attached to the front panel.

32. The inflatable airbag system of claim 25, wherein the support core is attached to both the front and rear panels.

33. The inflatable airbag system of claim 25, wherein the support core breaks into smaller pieces in response to injection of inflation gases into the inflatable chamber.

34. The inflatable airbag system of claim 25, wherein the rear panel is directly attached to the front panel.

35. The inflatable airbag system of claim 34, wherein the rear panel deforms in response to injection of inflation gases into the inflatable chamber.

36. The inflatable airbag system of claim 25, further comprising an extensible bellows panel attached to both the front and rear panels.

\* \* \* \* \*